(12) United States Patent
Wu et al.

(10) Patent No.: US 12,646,425 B2
(45) Date of Patent: Jun. 2, 2026

(54) LARGE ANIMAL MODEL OF TRAUMATIC OPTIC NEUROPATHY

(71) Applicant: THE EYE HOSPITAL OF WENZHOU MEDICAL UNIVERSITY, Wenzhou City (CN)

(72) Inventors: Wencan Wu, Wenzhou City (CN); Yikui Zhang, Wenzhou City (CN); Si Zhang, Wenzhou City (CN); Shengjian Lu, Wenzhou City (CN); Senmiao Zhu, Wenzhou City (CN); Tian Xia, Wenzhou City (CN); Zhonghao Yu, Wenzhou City (CN); Boyue Xu, Wenzhou City (CN); Liao Yu, Wenzhou City (CN)

(73) Assignee: The Eye Hospital of Wenzhou Medical University, Wenzhou City (CN)

( * ) Notice: Subject to any disclaimer, the term of this patent is extended or adjusted under 35 U.S.C. 154(b) by 328 days.

(21) Appl. No.: 18/544,737

(22) Filed: Dec. 19, 2023

(65) Prior Publication Data

US 2025/0201148 A1    Jun. 19, 2025

(51) Int. Cl.
*G09B 23/30*        (2006.01)

(52) U.S. Cl.
CPC .................................. *G09B 23/306* (2013.01)

(58) Field of Classification Search
CPC .............................. G09B 23/30; G09B 23/306
See application file for complete search history.

(56) References Cited

U.S. PATENT DOCUMENTS

| | | | | |
|---|---|---|---|---|
| 4,429,685 | A | * 2/1984 | Zell | ........................ A61B 17/00 |
| | | | | 128/898 |
| 2016/0114163 | A1 | * 4/2016 | Franke | ................. A61N 1/3756 |
| | | | | 607/135 |

(Continued)

OTHER PUBLICATIONS

Wensi Tao et al, A Novel Mouse Model of Traumatic Optic Neuropathy Using External Ultrasound Energy to Achieve Focal, Indirect Optic Nerve Injury, Sep. 18, 2017, Scientific Reports, Article No. 11779, pp. 1-37. (Year: 2017).*

(Continued)

*Primary Examiner* — Steve Rowland
(74) *Attorney, Agent, or Firm* — Christensen, Fonder, Dardi & Busse PLLC; John P. Fonder

(57)            ABSTRACT

A method for constructing a clinically-relevant large animal model of traumatic optic neuropathy, employing a goat with orbital anatomy and optic nerve structure similar to humans as a model animal, overing the defects existing in other animals as TON model animals. The target model goat is obtained by screening parameters, such as a maximum transverse diameter of a coronal plane of a body of sphenoid bone and a wall width of a sphenoid bone, thereby facilitating the exposure of an optic nerve in a optic-canal segment under a nasal endoscopic surgery and quantitative injury. With the optic nerve injury animal model, the clinical TON pathogenesis can be explored by studying the optic nerve at the injured optic canal. In the prepared TON animal model, the injured optic nerve is closer to the brain, which is beneficial to rebuilding the synaptic connection.

5 Claims, 6 Drawing Sheets
(6 of 6 Drawing Sheet(s) Filed in Color)

(56) References Cited

U.S. PATENT DOCUMENTS

| | | | |
|---|---|---|---|
| 2020/0053989 A1* | 2/2020 | Wu | A61D 1/00 |
| 2024/0238295 A1* | 7/2024 | Zeng | A61P 25/28 |
| 2025/0201148 A1* | 6/2025 | Wu | G09B 23/306 |

OTHER PUBLICATIONS

Yikul Zhang et al, Cold Protection Allows Local Cryotherapy in a Clinical-Relevant Model of Traumatic Optic Neuropathy, Mar. 30, 2022, eLife, pp. 1-31. (Year: 2022).*

* cited by examiner

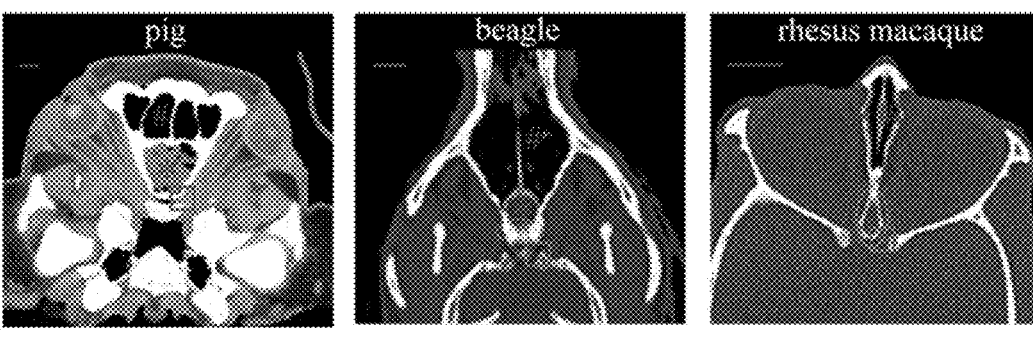
Fig. 1A Fig. 1B Fig. 1C
Fig. 2A Fig. 2B Fig. 2C Fig. 2D
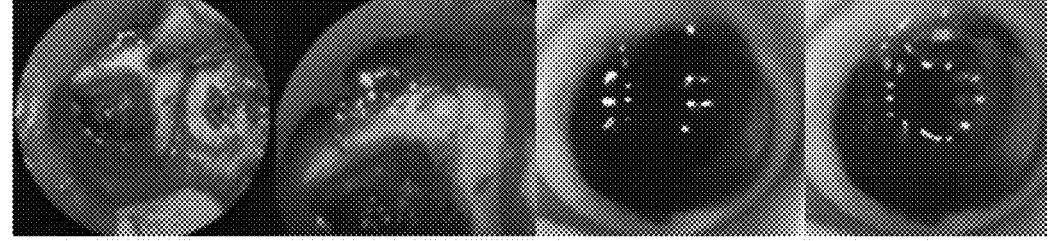
Fig. 3A Fig. 3B Fig. 3C
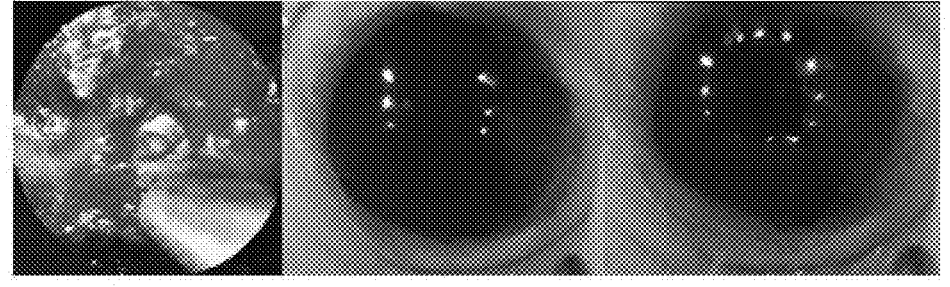
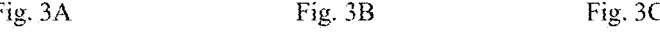
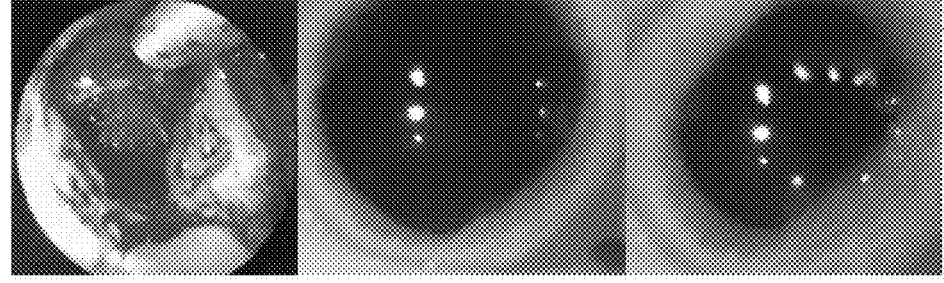
Fig. 4 A Fig. 4B Fig. 4C

RGC density, 3mpi

CL     Inj-1     Inj-2     Inj-3     Inj-4

ON density baseline     1wpi     1mpi     2mpi     3mpi

OCT-GCC thickness

LARGE ANIMAL MODEL OF TRAUMATIC OPTIC NEUROPATHY

TECHNICAL FIELD

The present disclosure relates to the technical field of animal models of diseases, and in particular, to a method for constructing a clinically relevant large animal model of traumatic optic neuropathy.

BACKGROUND

Traumatic optic neuropathy is a common ocular trauma disease in clinics, and there is still no effective evidence-based medicine proven effective treatment. The lack of ideal animal models at home and abroad is one of the keys to limiting the research of mechanisms and the development of new therapies. Previous models of optic nerve diseases often used small animals such as rodents as model animals, where the retrobulbar optic nerve was clipped or cut, and the treatment was mainly systemic therapy and intraocular injection, which were inconsistent with the characteristics of clinical traumatic optic nerve diseases. Furthermore, almost all the existing injury models have the following problems: 1. retrobulbar/intraorbital optic nerve injury: the injury of the optic nerve in an inner segment of the optic canal cannot be accurately achieved; 2. blind puncture of orbital apex optic nerve: the operator cannot look directly and relies solely on personal skills, resulting in significant variations in injury; 3. craniotomy injury to prechiasmatic optic nerve: the injury is large and subsequent experiments cannot be performed.

In the prior art, a variety of experimental animals such as beagles, pet pigs and rhesus macaques have been used. However, imaging (CT) and anatomy have found that these animals have such difficulties as small sphenoid bone, lack of well-pneumatized sphenoid sinus cavity and narrow space for surgical pathway, which make it difficult for a nasal endoscope (4 mm outer diameter) and a surgical grinding head (2.5 mm outer diameter) used in nasal endoscopic surgery to reach the optic nerve through the nasal cavity and the body of sphenoid bone and easily injure adjacent arteries, veins and brain tissues.

Previous models of optic nerve injury usually used direct transection or clamp injury to injure the optic nerve, which is inconsistent with the pathogenesis of clinical traumatic optic neuropathy where external forces directly act on the optic canal and cause bone fragments to be directly embedded, or external forces are transmitted to the optic canal through the head and face bones and cause optic nerve traction and deformation.

SUMMARY OF THE INVENTION

To solve the technical defects existing in the prior art, the present disclosure provides a method for constructing a clinically relevant large animal model of traumatic optic neuropathy (TON). The method selects a more satisfactory goat as a model animal, causes the optic canal to fracture and bone fragments to be embedded in the optic nerve by testing different striking strengths without directly damaging the optic nerve, and employs complete disappearance of the direct pupillary light reflex (PLR) of the injured eye on the second day after injury as a gold standard for successful modeling to simulate the pathogenesis of clinical traumatic optic neuropathy.

The technical solution adopted by the present disclosure is a method of constructing a clinically relevant large animal model of traumatic optic neuropathy, comprising:

(1) preoperatively selecting a sphenoid bone of a goat skull using CT scanning and confirming a surgical pathway: performing skull CT plain scan and three-dimensional model reconstruction for all target goats before surgery, and selecting a goat meeting the following conditions as a goat model of quantitative injury:

a. a maximum transverse diameter of a coronal plane of a body of sphenoid bone of the goat is 14-16 mm;

b. pneumatization of a body cavity of the sphenoid bone is well; and c. the sphenoid bone has a wall width of less than 2 mm;

(2) preoperatively anesthetizing and preparing: anesthetizing animals by intramuscular injection of xylazine, intubating with endotracheal tubes, and maintaining the animals under anesthesia with 3.5% isoflurane and a 50/50% air-oxygen mixture at a constant flow rate of 2 L/min, with the animals covered with blankets to maintain core body temperature during anesthesia and recovery; and (3) preparing the goat model of traumatic optic neuropathy: making an incision in skin of a nasal cavity, suspending the skin to both sides, grinding bones under the skin to expose the nasal cavity, removing a middle turbinate, finding an upper frontal sinus and straightly cutting soft tissues below the frontal sinus, clearing an olfactory nerve to expose a white body of sphenoid bone, making an incision at a connection part of a nasal septum and the body of sphenoid bone using a sickle knife, then extending the incision upwards and downwards using a curved scissor to free and remove the nasal septum, exposing and straightly cutting the left olfactory nerve, removing bones at the connection part of the nasal septum and the body of sphenoid bone using a rongeur to expose a bone wall in front of a sphenoid sinus, removing the bone wall in front of the sphenoid sinus by dynamic rough grinding, and removing contents in the sphenoid sinus to expose a bone wall of a optic canal; directly striking the bone wall of the optic canal by a striking device to obtain a quantitative injury model, rinsing the nasal cavity with iodophor, and then placing a gelatin sponge; checking that there is no residual foreign body in each cavity, and stopping anesthesia; and suturing the skin and periosteum using splay suture and interrupted suture to close the nose to obtain the large animal model of traumatic optic neuropathy.

The goat is a male Saanen dairy goat, aged 4-6 months and weighing 9-23 kilograms.

The striking device is a quantitative injury striking device.

The striking device directly strikes the bone wall of the optic canal with a striking area of $1.256 \times 10^{-5}$ m$^2$, a striking depth of 2 mm, and a striking pressure of 3-5 MPa.

The quantitative injury striking device is pneumatically actuated.

The present disclosure has the following beneficial effects. A method for constructing a clinically relevant large animal model of traumatic optic neuropathy is provided. The method employs a Saanen dairy goat with orbital anatomy and optic nerve structure similar to humans as a model animal, overing the defects existing in other animals as TON model animals. The target model goat is obtained by screening parameters, such as the maximum transverse diameter of the coronal plane of the body of sphenoid bone and the wall width of the sphenoid bone, thereby facilitating the exposure of optic nerve in a goat optic canal segment under a nasal endoscopic surgery and quantitative injury. With the optic nerve injury animal model, the clinical TON pathogenesis can be explored by studying the optic nerve at the injured optic canal. In the prepared TON animal model, the injured optic nerve in an inner segment of the canal is closer to the brain, which is beneficial to rebuilding the synaptic connection between the optic nerve and the brain to realize the functional regeneration of the optic nerve. The prepared animal model of optic nerve injury can be used for local administration of drugs to the optic nerve through the nasal cavity, thereby achieving the goal of precise treatment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A, 1B, and 1C shows planar CT plain scans of the body of sphenoid bone of a pet pig, a beagle and a rhesus macaque.

FIGS. 2A, 2B, 2C, and 2D shows a nasal endoscopic surgery field (FIGS. 2A and 2B) and the pupillary light reflex (disappear in the left eye) (FIGS. 2C and 2D) after injury with a 4 MPa strike force.

FIGS. 3A, 3B, and 3C shows a nasal endoscopic surgery field (FIG. 3A) and the pupillary light reflex (disappear in the left eye) (FIGS. 3B and 3C) after injury with a 6 MPa strike force.

FIGS. 4A, 4B, and 4C shows a nasal endoscopic surgery field (FIG. 4A) and the pupillary light reflex (present in the right eye) (FIGS. 4B and 4C) after injury with a 2 MPa strike force.

DETAILED DESCRIPTION OF THE INVENTION

Figures 5A, 5B, 5C, 5D:
FIGS. 5A, 5B, 5C, and 5D shows the goat skull three-dimensional reconstruction model (FIG. 5A) and the results of planar CT plain scans of the body of sphenoid bone (FIGS. 5B, 5C and 5D).

The following clearly and completely describes the technical solutions in the examples of the present disclosure with reference to the accompanying drawings in the examples of the present disclosure. Apparently, the described examples are merely a part rather than all of the examples of the present disclosure. Based on the examples of the present disclosure, all other examples obtained by a person of ordinary skill in the art without inventive effort fall within the scope of the present disclosure.

Example 1. Experimental Animals

Experiments were performed in strict compliance with animal experimental ethics. Male Saanen dairy goats, aged 4-6 months and weighing 9-23 kilograms, were ordered from China Hangzhou Caimu Animal Husbandry Company. All animals were housed in a constant temperature room under a controlled temperature (21±2° C.) with a 12-hour light/12-hour dark day and night rhythm and fed freely.

Example 2. Methods of Anesthesia

Two general anesthesia methods were employed in the present disclosure. (1) Xylazine anesthesia: xylazine (3 mg/kg, China Jilin Huamu Animal Health Products Co., Ltd.) was intramuscularly injected. At the end of the experiment, animals were awakened by intramuscular injection of 1.5 mg/kg of xylazine antagonist. (2) Isoflurane anesthesia: propofol (5 mg/kg, Xi'an Libang Enterprise Joint Management Co., Ltd., China) was used for intravenous anesthesia. Atropine (0.05 mg/kg IV, Guangdong Jieyang Longyang Animal Pharmaceutical Co., Ltd.) was then administered to reduce bronchial secretions and protect the heart from vagal nerve stimulation. After induction of anesthesia, the animals were intubated with 6.0 mm endotracheal tubes (Henan Tuoren Medical Devices Co., Ltd.) and maintained under anesthesia with 3.5% isoflurane (China RWD Life Sciences Co., Ltd.) and a 50/50% air-oxygen mixture at a constant flow rate of 2 L/min. At the end of intubating with endotracheal tubes, all animals were treated with gentamicin (8 mg/kg/day IM, Shanxi Ruicheng Kelong Co., Ltd.) and ceftiofur sodium (20 mg/kg/day IM, Jiangxi Huatu Co., Ltd.) for 3 days to prevent infection. The animals were covered with blankets to maintain core body temperature during anesthesia and recovery.

Example 3. Preoperative Sphenoid Bone Selection by Goat Skull CT and Confirmation of a Surgical Pathway As shown in FIGS. 5A, 5B, 5C and 5D, skull CT plain scan and three-dimensional model reconstruction were performed for all target goats before surgery to select a model goat suitable for quantitative injury. The specific selection criteria were as follows: 1. the maximum transverse diameter of the coronal plane of a body of sphenoid bone is about 15 mm; 2. pneumatization of a body cavity of the sphenoid bone is well; 3. the sphenoid bone has a wall width of less than 2 mm. All of the above conditions facilitate the exposure of the goat optic canal under a nasal endoscopic surgery and quantitative injury.

Example 4. Preparation of Goat Optic Nerve Exposure and Traumatic Optic Nerve Model Animals were anesthetized by intramuscular injection of 1.5 mg/kg of xylazine (3 mg/kg, China Jilin Huamu Animal Health Products Co., Ltd.), intubated with 6.0 mm endotracheal tubes (Henan Tuoren Medical Devices Co., Ltd.), and maintained under anesthesia with 3.5% isoflurane (China RWD Life Sciences Co., Ltd.) and a 50/50% air-oxygen mixture at a constant flow rate of 2 L/min. The animals were covered with blankets to maintain core body temperature during anesthesia and recovery. Under the guidance of surgical navigation (Medtronic), nasal endoscopic surgery (Beijing Delong Company) was performed to expose the optic canal of the goat skull.

The specific surgical pathway is as follows: a 2×3 cm incision in the skin of the nasal cavity was made and the skin was suspended to both sides. The bones under the skin were ground to expose the nasal cavity and the middle turbinate was removed. The upper frontal sinus was found and soft tissues below the frontal sinus were straightly cut. The olfactory nerve was clear to expose the white body of sphenoid bone. An incision was made at the connection part of the nasal septum and the body of sphenoid bone using a sickle knife, and then the incision was extended upwards and downwards using a curved scissor to free and remove the nasal septum.

Figure 6A:
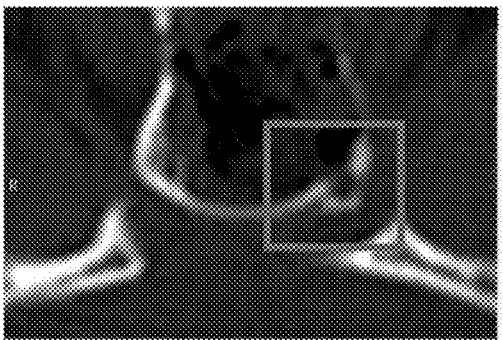
FIGS. 6A, 6B, and 6C shows images of a CT plain scan (FIG. 6A) and nasal endoscopy (FIGS. 6B and 6C) of the bone wall fracture of the sphenoid bone after quantitative pneumatic injury.
Figures 6B, 6C:
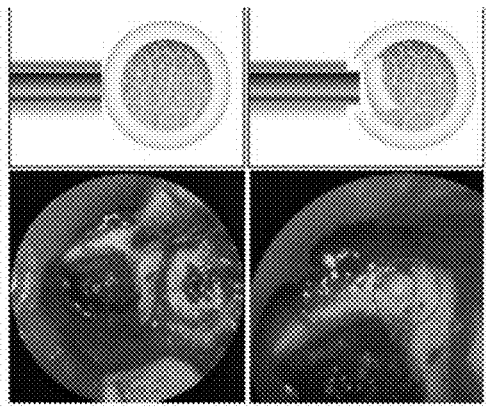
Figures 7A, 7B:
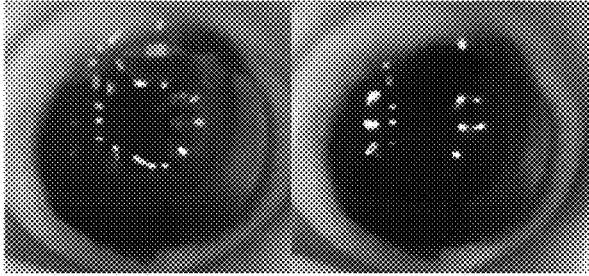
FIG. 7A shows the disappearance of direct light reflex.
FIG. 7B shows the disappearance of indirect light reflex.
Figures 7C, 7D:
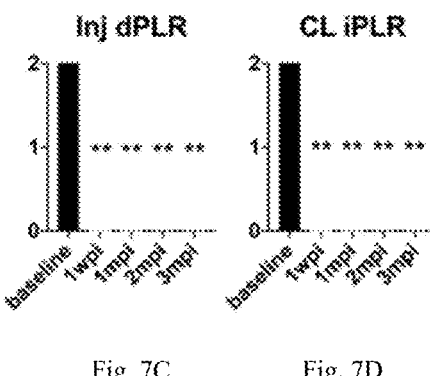
FIGS. 7C and 7D show quantification of PLR score (2 represents sensitively to light reflex, 1 represents insensitively to light reflex, 3 represents disappearance to light reflex), n=3. Two-way ANOVA and Dunnett's multiple comparison tests were performed. Data were expressed as mean± standard deviation.
Figure 8A:
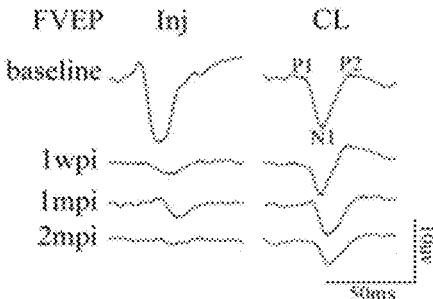
FIGS. 8A, 8B, 8C, and 8D shows FVEP representative waveforms of the injured eye and the contralateral eye before injury and at 1 week, 1 month and 2 months after injury (FIG. 8A), and quantitative analysis for FVEP amplitude ratios between the injured eye and the contralateral eye at different time points after injury at different frequencies (FIG. 8B), n=5; PERG representative waveforms of the injured eye and the contralateral eye before injury and at 1 week, 1 month, 2 months and 3 months after injury (FIG. 8C), and quantitative analysis for PERG amplitude ratios between the injured eye and the contralateral eye at different time points after injury at different frequencies (FIG. 8D), n=5. Two-way ANOVA and Dunnett's multiple comparison tests were performed. Data were expressed as mean± standard deviation.
Figure 8B:
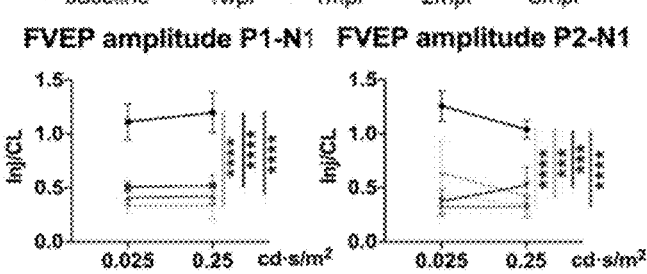
Figure 8C:
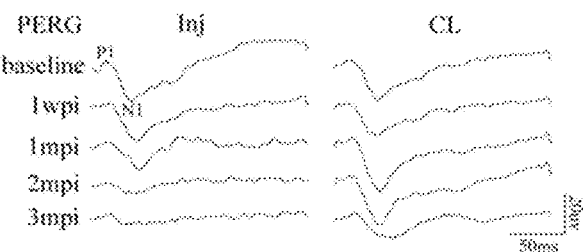
Figure 8D:
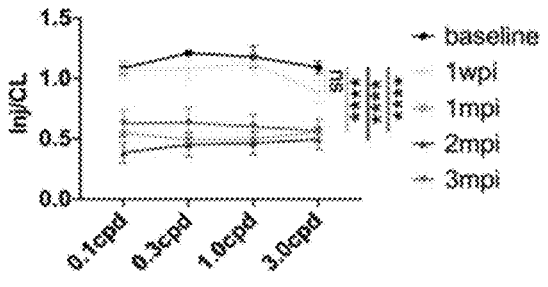

The left olfactory nerve was exposed and straightly cut. The bones at the connection part of the nasal septum and the body of sphenoid bone were removed using a rongeur to expose the bone wall in front of the sphenoid sinus. The bone wall in front of the sphenoid sinus was removed by dynamic rough grinding, and contents in the sphenoid sinus were removed to expose the bone wall of the optic canal. Our self-developed optic canal fracture pen was used to strike directly the bone wall of the optic canal after setting the pneumatic parameters (quantitative injury model). The results of images of a CT plain scan and nasal endoscopy of the bone wall fracture of the sphenoid bone after quantitative pneumatic injury were shown in FIGS. 6A, 6B, and 6C. The nasal cavity was rinsed with 20 ml of iodophor, and then a gelatin sponge was placed. Each cavity was checked that there was no residual foreign body, and anesthesia was stopped. The skin and periosteum were sutured using splay suture and interrupted suture to close the nose.

At the end of modeling, the animals were awakened by intramuscular injection of xylazine antagonist. After the animals woke up, the endotracheal intubation was removed, and the animals were treated with gentamicin (8 mg/kg/day IM, Shanxi Ruicheng Kelong Co., Ltd.) and ceftiofur (20 mg/kg/day IM, Jiangxi Huatu Co., Ltd.) for 3 days to prevent infection.

Detection of Optic Nerve Structure and Function in the Animal Model

Example 5. Immunohistochemical Staining of Retinal Ganglion Cells

Goats were euthanized by intravenous injection of potassium chloride (10%, 20 milliliters), and then their eyeballs were collected. The anterior segments were removed and eye cups were made. Eye cups were fixed in 4% paraformaldehyde solution for 24 hours. 4 Circular retinal sections with a diameter of 1 millimeter were cut from 4 different retinal quadrants using a corneal trephine (Jiangsu Zhonglin Dongsheng Medical Devices Co., Ltd.). After overnight blocking with 1:20 dilution of goat serum (China Beyotime Biotechnology Institute, China) in 0.5% PBST, the retinal sections were incubated with 1:4000 dilution of RBPMS guinea pig primary antibody (ProSci, California) for 24 hours at room temperature. The retinal sections were then washed 5 times with PBS for 15 minutes each. 1:200 Dilution of secondary antibody (Cy3) (Jackson ImmunoResearch, Pennsylvania) was then added to the PBS, and the retinas were incubated for 12 hours at room temperature. After rinsing 5 times with PBS for 15 minutes each, the retinal sections were fixed on glass slides. Confocal microscope images were taken with a Zeiss LSM710 system under a 20× objective, and then RBPMS-positive retinal ganglion cells were counted manually using ImageJ software (National Institutes of Health, Bethesda, MD).

Example 6. Flash Visual Evoked Potentials (FVEP)

FVEP recordings were made in Faraday cages (electrostatic shielding to reduce external electromagnetic wave interference) using a GT-2008V electrophysiological instrument from Chongqing Guote Company. Animals were anesthetized with xylazine and dilated with tropicamide eye drops. Two steel skull screws were placed in the center of the frontal bone and the midpoint of the occipital ears, respectively, to reduce the electrode impedance, and then fixed to the recording electrode and the reference electrode by alligator clips, respectively. A needle electrode was placed in the subcutaneous space below the reference electrode. The impedance of each electrode shall be kept below 10 kΩ. A large ganzfeld full-field stimulator was used, and the goat skull was placed in the chamber of the stimulator. After 5 minutes of dark adaptation, FVEP recordings were made under a light stimulus of 0.025, 0.25 and 3.0 cd·s/m2, respectively. After FVEP recording at one light intensity, there were two minutes of dark adaptation during which artificial eye drops were instilled to wet the cornea. After completing the FVEP recording of one eye, there were five minutes of dark adaptation, and then the FVEP recording of the other eye was performed. The first positive wave in the FVEP waveform was P1 (typically around 10 ms), the first negative wave was N1 (typically around 35 ms), and the second positive wave was P2 (typically around 75 ms). P1 and P2 amplitudes were measured from N1 trough to P1 and P2 peaks, respectively.

Example 7. Pattern Electroretinogram (PERG)

PERG recordings were performed in Faraday cages using a GT-2008V electrophysiological instrument from Chongqing Guote Company. Goats were anesthetized with xylazine (3 mg/kg, IM). Two reference electrodes were placed subcutaneously in bilateral outer borders. A steel skull screw was implanted in the center of the forehead and connected to the ground electrode by an alligator clip. After applying carbomer eye gel to the eyes, two ERG-Jet recording electrodes were placed on the corneal surfaces of the eyes, and a reference electrode was inserted twice subcutaneously into the lateral canthus. The impedance of the electrode shall be below 10 kΩ. Two 47.6×26.8 cm computer screens were placed directly in front of the eyes at a distance of 50 cm from the corneal apex at an opening angle of 50×27 degrees. The position of each screen was adjusted so that the projection of the goat pupil was aligned with the center of the screen. Visual stimuli comparing the inverted black and white checkerboard (2.4 Hz time frequency) were displayed on both screens. The images had a contrast of 96% and a brightness of 200 cd/m2. Four spatial frequencies (0.1 cycles/degree, 0.3 cycles/degree, 3.0 cycles/degree, and 12.6 cycles/degree) were tested consecutively. PERG responses were recorded separately in both eyes by either binocular stimulation (eyes were both uncovered) or monocular stimulation (the other eye was covered). After stimulation, the PERG signal was recorded and amplified 16000 times. To reduce noise, the frequency of the band-pass filter was set to 1-100 Hz. For each spatial frequency, 64 consecutive recorded data were averaged to obtain a waveform. The first positive wave in the waveform was designated as P1 (typically around 25 ms), and the first negative wave was designated as N1 (typically around 55 ms). The amplitude was measured from N1 to P1.

Example 8. Pupillary Light Reflex (PLR)

The pupillometer consists essentially of three parts: a light stimulation system containing 12 LEDs, two infrared cameras (Kingcent Technology, China) that simultaneously record the dynamic pupil behavior of the eyes, and two laptop computers for data collection and analysis on PLR. Animals were anesthetized with xylazine (3 mg/kg, IM) and then dark adapted with a black-eye mask under dim light for 5 minutes. The eyes were then fully exposed with an eye speculum. Artificial tears were used to wet the cornea during the test. The infrared camera was positioned at a distance of 5 cm from the cornea. Light stimulation (230 lx) was turned on for two seconds to induce pupil contraction and then turned off for 12 seconds to dilate the pupil. The switching cycle of the light was repeated three times for each eye. After the PLR test was performed on one eye, the same procedure was repeated on the other eye. The PLR results were divided into 3 grades. Grade 2 represents normal PLR, with rapid and significant pupil contraction after mild stimulation. Grade 1 represents impaired PLR, with prolonged latency or reduced amplitude of pupil contraction compared to grade 2. Grade 0 represents almost no PLR, with little pupil contraction. To quantify the PLR results, we assign numbers 0, 1 and 2 to grades 0, 1 and 2, respectively.

Example 9. Retinal Optical Coherence Tomography (OCT)

Retinal OCT imaging was used to measure the thickness of the retinal ganglion cell complex (GCC, including RNFL, RGC, and IPL layers). Goats were anesthetized with xylazine (3 mg/kg, IM) and dilated. The pupils were fully exposed with an eye speculum. Retinal OCT images were taken using a Heidelberg OCT system with an 870 nm wavelength light source and a 30-degree viewing angle system. The optical axial resolution was 12 μm. Line scan and high-resolution mode were employed. The central retina (centered on the optic nerve head (ONH)) of goats was scanned at an average of 30 frames. The thickness of the GCC was measured at 1500 μm, 2000 μm and 2500 μm on both sides of the optic nerve head. Supernasal, nasal, infranasal, infratemporal, temporal and supratemporal were marked as NS, N, NI, TI, T and TS, respectively.

Statistical Methods

All data from the present disclosure were analyzed using GraphPad (7.0) software. To compare the two sets of data, a t-test or non-parametric test (Mann-Whitney) was used. To compare multiple sets of data, a one-way analysis of variance (with Dunnett's multiple comparison test) or non-parametric Kruskal-Wallis test (with Dunn's multiple comparison test) was used. FVEP, PERG, OCT and PLR data were analyzed using two-way analysis of variance (multiple comparisons with Dunnett). The asterisk indicates a statistically significant difference. *: $p < 0.05$, : $p < 0.01$, *: $p < 0.001$, and ****: $p < 0.0001$. Data were expressed as mean± standard deviation.

Experimental Results

The present disclosure has optimized and analyzed a series of in vivo detection methods to evaluate the function and structure of goat optic nerve after quantitative injury. First, at the level of pupillary light reflex, the direct light reflex of the injured eye and the indirect light reflex of the contralateral eye after quantitative injury disappeared at 1 week, 1 month, 2 months and 3 months after injury, indicating that the afferent and efferent nerves of pupillary light reflex of the injured eye had suffered permanent injury (FIGS. 7A, 7B, 7C and 7D).

On the other hand, we also concluded that there was irreversible functional injury to the optic nerve after quantitative injury by comparing FVEP and PERG electrophysiological detection results of the injured eye and the contralateral eye before and after injury (FIGS. 8A, 8B, 8C, and 8D).

Figure 9A:
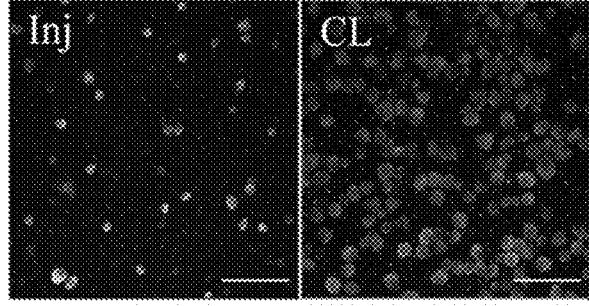
FIGS. 9A and 9B shows typical confocal images of RBMPS-positive RGCs from the injured eye and the contralateral eye after 3 months of quantitative injury to the goat optic nerve, with a scale of 100 μm (FIG. 9A), and quantitative analysis for the density of RBPMS-positive RGCs, n=5 (FIG. 9B). Two-way ANOVA and Dunnett's multiple comparison tests were performed. Data were expressed as mean± standard deviation.
Figure 9B:
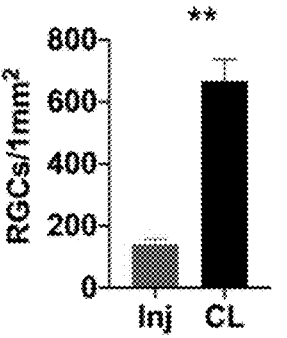
Figure 10A:
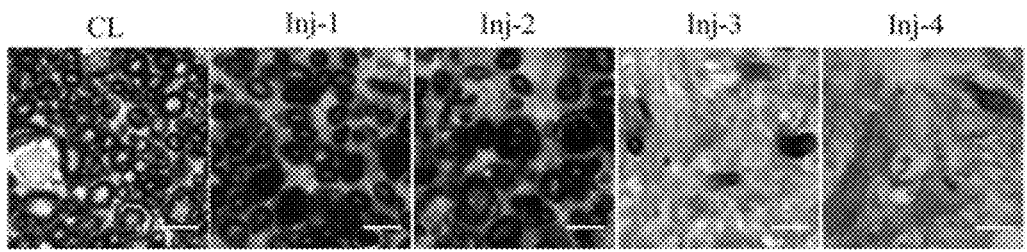
FIGS. 10A and 10B shows microscopic images of semi-thin electron microscopic sections of optic nerve axons from the injured eye and the contralateral eye at 1 month, 2 months, 3 months and 4 months after quantitative injury to goat optic nerve, with a scale of 100 μm (FIG. 10A), and quantitative analysis for the density of optic nerve axons, n=5 (FIG. 10B). Two-way ANOVA and Dunnett's multiple comparison tests were performed. Data were expressed as mean± standard deviation.
Figure 10B:
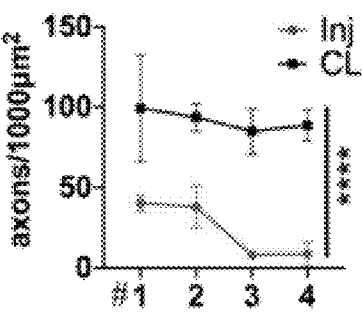
Figure 11A:
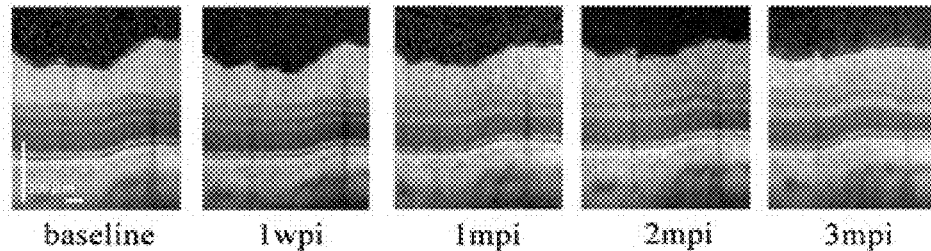
FIGS. 11A and 11B shows an OCT representative image of the retinal ganglion complex from the injured eye of the goat before injury and at 1 month, 2 months, 3 months and 4 months after quantitative injury, with a scale of 100 μm (FIG. 11A), and quantitative analysis for the thickness of retinal ganglion complex, n=5 (FIG. 11B). Two-way ANOVA and Dunnett's multiple comparison tests were performed. Data were expressed as mean± standard deviation.
Figure 11B:
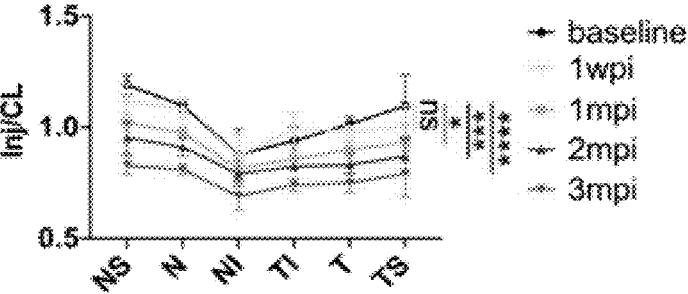
Figure 12:
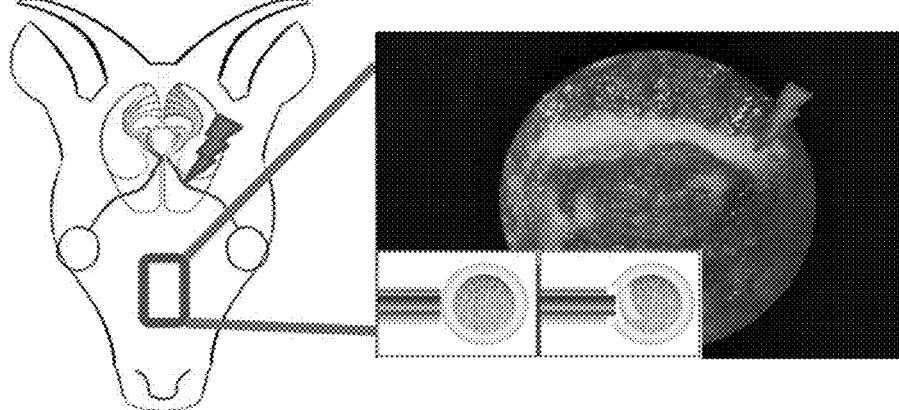
FIG. 12 shows a conceptual diagram of the goat optic nerve quantitative injury model and a live image of nasal endoscopic surgery.

Meanwhile, we also found that the retinal ganglion cell body and axon showed irreversible morphological and structural injury after quantitative injury by quantitatively comparing the retinal ganglion cell body (FIGS. 9A and 9B), the density of optic nerve axon (FIGS. 10A and 10B) and the thickness of the retinal ganglion cell complex layer (FIGS. 11A and 11B) of the injured eye and the contralateral eye at different periods.

The advantages of the present disclosure are as follows:

1. The optic nerve at the optic canal can be injured, which is closer to the clinical TON pathogenesis.

2. Safe and efficient quantitative injury to the optic nerve can be achieved.

3. The optic nerve in the inner segment of the optic canal is closer to the brain so that the regenerated optic nerve in this model can start at the inner segment of the optic canal, which is more beneficial to rebuilding the synaptic connection between the optic nerve and the brain.

4. Nasal administration can be used to achieve local treatment of injured optic nerve.

5. The size of the goat eyeball optic nerve is similar to that of humans, and the surgical pathway, instruments and devices required for this model are consistent with those for optic nerve decompression surgery in clinical TON patients, which enables rapid clinical conversion of new therapies based on this model.

It should be understood by those skilled in the art that although the present disclosure has been described with reference to the above specific examples, the inventive concept of the present disclosure is not limited thereto. Any modification of the inventive concept is intended to be included within the scope of the patent claims.

The examples described above are only preferred examples of the present disclosure and are not intended to limit the scope of the present disclosure. All technical solutions falling within the spirit of the present disclosure will fall within the scope of the present disclosure. It should be noted that many modifications and variations could be made by a person of ordinary skill in the art without departing from the principle of the present disclosure. These modifications and variations should also be considered to fall within the scope of the present disclosure.

The invention claimed is:

1. A method for constructing a clinically relevant large animal model of traumatic optic neuropathy, comprising:

(1) preoperatively selecting bodies of sphenoid bones of goat skulls using CT scanning and confirming a surgical pathway: performing skull CT plain scan and three-dimensional model reconstruction for a plurality of goats before surgery, and selecting goats meeting the following conditions as goat models of quantitative injury:

a. a maximum transverse diameter of a coronal plane of a body of sphenoid bone of the selected goat is 14-16 mm;

b. pneumatization of a body cavity of the sphenoid bone is well; and c. the sphenoid bone has a wall width of less than 2 mm;

(2) preoperatively anesthetizing and preparing: anesthetizing the selected goats by intramuscular injection of xylazine, intubating with endotracheal tubes, and maintaining the selected goats under anesthesia with 3.5% isoflurane and a 50/50% air-oxygen mixture at a constant flow rate of 2 L/min, with the selected goats covered with blankets to maintain core body temperature during anesthesia and recovery; and (3) preparing the goat model of traumatic optic neuropathy: making an incision in skin of a nasal cavity, suspending the skin to both sides, grinding bones under the skin to expose the nasal cavity, removing a middle turbinate, finding an upper frontal sinus and straightly cutting soft tissues below the upper frontal sinus, clearing an olfactory nerve to expose a white body of sphenoid bone, making an incision at a connection part of a nasal septum and the body of sphenoid bone using a sickle knife, then extending the incision upwards and downwards using a curved scissor to free and remove the nasal septum, exposing and straightly cutting the left olfactory nerve, removing bones at the connection part of the nasal septum and the body of sphenoid bone using a rongeur to expose a bone wall in front of a sphenoid sinus, removing the bone wall in front of the sphenoid sinus by dynamic rough grinding, and removing contents in the sphenoid sinus to expose a bone wall of an optic canal; directly striking the bone wall of the optic canal with a striking device to obtain a quantitative injury model, rinsing the nasal cavity with iodophor, and then placing a gelatin sponge; checking that there is no residual foreign body in each cavity, and stopping anesthesia; and suturing the skin and periosteum using splay suture and interrupted suture to close the nose to obtain the large animal model of traumatic optic neuropathy.

2. The method for constructing a clinically relevant large animal model of traumatic optic neuropathy according to claim 1, wherein each of the plurality of goats is a male Saanen dairy goat, aged 4-6 months and weighing 9-23 kilograms.

3. The method for constructing a clinically relevant large animal model of traumatic optic neuropathy according to claim 1, wherein the striking device is a quantitative injury striking device.

4. The method for constructing a clinically relevant large animal model of traumatic optic neuropathy according to claim 3, wherein the striking device directly strikes the bone wall of the optic canal with a striking area of $1.256 \times 10^5 \, m^2$, a striking depth of 2 mm, and a striking pressure of 3-5 MPa.

5. The method for constructing a clinically relevant large animal model of traumatic optic neuropathy according to claim 3, wherein the quantitative injury striking device is pneumatically actuated.

* * * * *